B. C. BAKER
Anti-Friction Journal Boxes

116795 Patented Jul 11 1871

UNITED STATES PATENT OFFICE.

BURR C. BAKER, OF TOLEDO, OHIO.

IMPROVEMENT IN ANTI-FRICTION JOURNAL-BOXES.

Specification forming part of Letters Patent No. 116,795, dated July 11, 1871.

*To all whom it may concern:*

Be it known that I, BURR C. BAKER, of Toledo, in the county of Lucas and State of Ohio, have invented a new and useful Improvement in Anti-Friction Journal-Boxes; and I do declare that the following is a true and accurate description thereof, reference being had to the accompanying drawing and to the letters of reference marked thereon, and being a part of this specification, in which—

Figure 1:
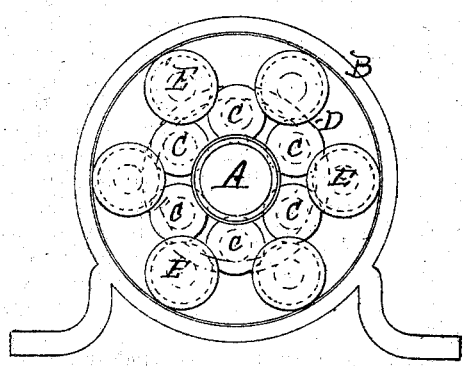
Figure 2:
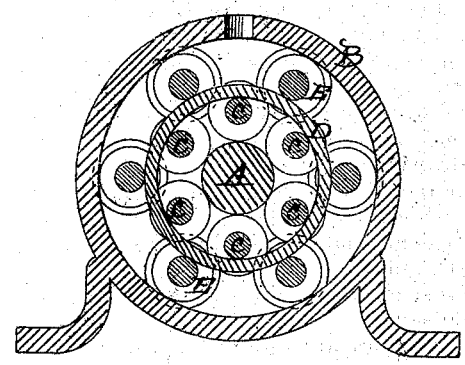
Figure 3:
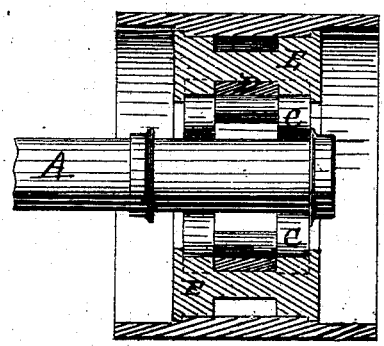

Figure 1 is an end elevation of my improved journal-box, showing the shaft in section. Fig. 2 is a cross section, and Fig. 3 is a horizontal section of the same.

Like letters indicate like parts in each figure.

The nature of this invention relates to an improvement in that class of journal-boxes wherein the shaft rotates with a series of friction-rollers interposed between it and the walls of the cylindrical journal-box; and it consists in the peculiar construction and arrangement, within a cylindrical box, of two series of anti-friction rollers, with a metallic band interposed between the outer and inner series in such a manner that the shaft will bear upon the inner series of rollers, which, in turn, bears upon the outer series of rollers and the interposed ring, the pressure being finally distributed by the outer rollers upon the walls of the box. The rollers and rings being constantly in motion in an opposite direction to the shaft, the latter is subjected only to a rolling friction; the wear in all parts is reduced to a minimum, and is uniform throughout.

In the drawing, A represents a shaft or axle, and B a cylindrical journal-box. C are anti-friction rollers, of the form shown in Fig. 3, being cylinders, with a journal turned down in the middle portion of their length, with one end, as a sleeve, removable, so that a ring, D, may be slipped down over the journal part of a series of these rollers arranged about the shaft and the collars or sleeves replaced to complete the rollers, as shown in said figure. E are rollers similar in shape to the first, but solid, which are disposed around the band and between the internal series of rollers, so that the journals of the external rollers will bear against the exterior of the ring, while their ends will bear against the ends of the rollers C, and outwardly against the walls of the box. The ends of the rollers may be flanged, and the ends of the box counter-bored to prevent any lateral movement of the rollers therein, or any equivalent means may be used for the purpose.

It will be noticed that the loaded shaft bears upon any two or more of the rollers C which may be under it, which, in turn, distribute the load to the lower half of the cylindrical box through the ring and rollers E. The ring and both series of rollers travel around the box in an opposite direction to the shaft which imparts such motion to the inner series of rollers; consequently, all parts being in motion, none but a rolling friction is developed, and the wear in all parts must be uniform.

No lubricant is required, as there is no sliding friction to overcome.

In the present device, the outer series of rollers is of greater diameter than those of the inner series, but both series may be of the same diameter.

What I claim as my invention, and desire to secure by Letters Patent, is—

The combination, in a cylindrical journal-box, B, of the shaft A, the series of rollers C and E, and the ring D, all constructed, arranged, and operating substantially as described and shown.

BURR C. BAKER.

Witnesses:
H. F. EBERTS,
MYRON H. CHURCH.